United States Patent [19]

Swei

[11] Patent Number: 5,182,173
[45] Date of Patent: Jan. 26, 1993

[54] COATED PARTICLES AND METHOD FOR MAKING SAME

[75] Inventor: Gwo Swei, Northborough, Mass.

[73] Assignee: Rogers Corporation, Rogers, Conn.

[21] Appl. No.: 519,943

[22] Filed: May 7, 1990

[51] Int. Cl.$^5$ .............................................. B32B 25/20
[52] U.S. Cl. .................................... 428/391; 428/405; 427/387
[58] Field of Search ................. 427/387; 428/405, 391

[56] References Cited

U.S. PATENT DOCUMENTS

| | | | |
|---|---|---|---|
| 3,110,614 | 11/1963 | de Vries | 428/405 |
| 3,471,439 | 10/1969 | Bixler et al. | 260/41 |
| 4,054,465 | 10/1977 | Ziobrowski | 106/298 |
| 4,137,367 | 1/1979 | Sample, Jr. et al. | 428/405 |
| 4,152,315 | 5/1979 | Lee et al. | 260/37 SB |
| 4,162,243 | 7/1979 | Lee et al. | 260/37 SB |
| 4,173,560 | 11/1979 | Homan et al. | 260/37 SB |
| 4,500,659 | 2/1985 | Kroupa et al. | 523/213 |
| 4,529,774 | 7/1985 | Evans et al. | 524/860 |
| 4,732,931 | 3/1988 | Maxson | 524/862 |
| 4,874,662 | 10/1989 | Huhn | 427/387 |

FOREIGN PATENT DOCUMENTS

| | | |
|---|---|---|
| 0043640A | 6/1980 | European Pat. Off. |
| 0091737A | 10/1983 | European Pat. Off. |
| 0212870A | 4/1987 | European Pat. Off. |
| 0240333A | 10/1987 | European Pat. Off. |
| 0265839A | 5/1988 | European Pat. Off. |
| 0321322A | 6/1989 | European Pat. Off. |
| 53-88026 | 8/1978 | Japan |
| 54-162741 | 12/1979 | Japan |
| 6147865 | 5/1980 | Japan |
| 59-136355 | 8/1984 | Japan |
| 61-203160 | 9/1986 | Japan |
| 62-236821 | 10/1987 | Japan |
| 1-261451 | 10/1989 | Japan |

OTHER PUBLICATIONS

Dekkers, M. E. J., Dortmans, J. P. M., Heikens, D., "The effect of a rubbery interfacial layer on the tensile behavior of polystyrene-glass bead composites", Polymer Reports, Mar. 5, 1988.
Mark, J. E. and Sun, C. C., "Polymer-modified silica glasses", Polymer Bulletin 18, 259–264 (1987).
Plueddemann, E. P., "Bonding rigid polymers to mineral surfaces through a rubbery interface", 29th Annual Technical Conference, 1974. Reinforced Plastics/Composites Institute. The Society of the Plastics Industry, Inc.
Xanthos, M. and Woodhams, R. T., "Polymer encapsulation of colloidal asbestos fibrils", Journal of Applied Polymer Science, vol. 17, pp. 381–394 (1972).

Primary Examiner—Melvyn I. Marquis
Assistant Examiner—Karen A. Hellender
Attorney, Agent, or Firm—Fishman, Dionne & Cantor

[57] ABSTRACT

A composite filler material is disclosed. The filler material includes an inorganic core and a layer of crosslinked silicone elastomer covering the core and chemically bonded to the core. A process for making the composite filler material is also disclosed.

48 Claims, 1 Drawing Sheet

COATED PARTICLES AND METHOD FOR MAKING SAME

TECHNICAL FIELD

This invention is related to composite materials and more particularly to fillers for polymer matrix composite materials.

BACKGROUND OF THE INVENTION

Composite materials which exhibit improved toughness due to the presence of an interlayer between filler particles and the matrix material are known. For example, Bixler et al (U.S. Pat. No. 3,471,439) teach composite materials having improved toughness which include a matrix, non-reinforcing filler particles distributed throughout the matrix and an interlayer prepared by the free radical polymerization of unsaturated reactants. In "Binding Rigid Polymers To Mineral Surfaces Through A Rubbery Interface", by Edwin P. Plueddemann, Proceedings of the 29th Annual Technical Conference, 1974, Reinforced Plastics/Composites Institutes, The Society of the Plastics Industry, Inc., Plueddemann teaches glass fiber reinforced resin matrix composites having a rubbery thermoplastic interlayer between the filler and matrix.

SUMMARY OF THE INVENTION

A composite filler material is described. The coated filler comprises an inorganic core and a layer of crosslinked silicone elastomer covering the core and chemically bonded to the core. The coated filler may be used to produce highly filled thermoplastic polymer matrix composite materials that exhibit improved ductility and highly filled thermoset polymer matrix composite materials that exhibit improved toughness.

A method for making a composite filler material is also disclosed. The method comprises reacting mono-functionally terminated polysiloxane with a multifunctional silane to form a multifunctionally terminated polysiloxane. The multifunctionally terminated polysiloxane is reacted with a silane cross linking agent to form a reactive silicone network having unreacted silanol groups thereon. An inorganic filler material is coated with the reactive silicone network and the network is cured to form a crosslinked silicone elastomer coating that is chemically bonded to the filler material.

An alternative method for making a composite material is also disclosed. A multifunctional silane is reacted with an inorganic filler material to form a surface modified inorganic filler material having free silanol groups thereon. A second multifunctional silane is reacted with a monofunctionally terminated polysiloxane to form a multifunctionally terminated polysiloxane. The surface modified inorganic filler material is coated with the multifunctionally terminated polysiloxane. The multifunctionally terminated polysiloxane is reacted with the free silanol groups on the surface modified inorganic filler material and crosslinked to form a cross linked silicone elastomer layer that is chemically bonded to the filler material.

BRIEF DESCRIPTION OF THE DRAWINGS

The FIGURE shows a schematic cross sectional view of a particle of the composite filler material of the present invention.

DETAILED DESCRIPTION OF THE INVENTION

Figure 1:
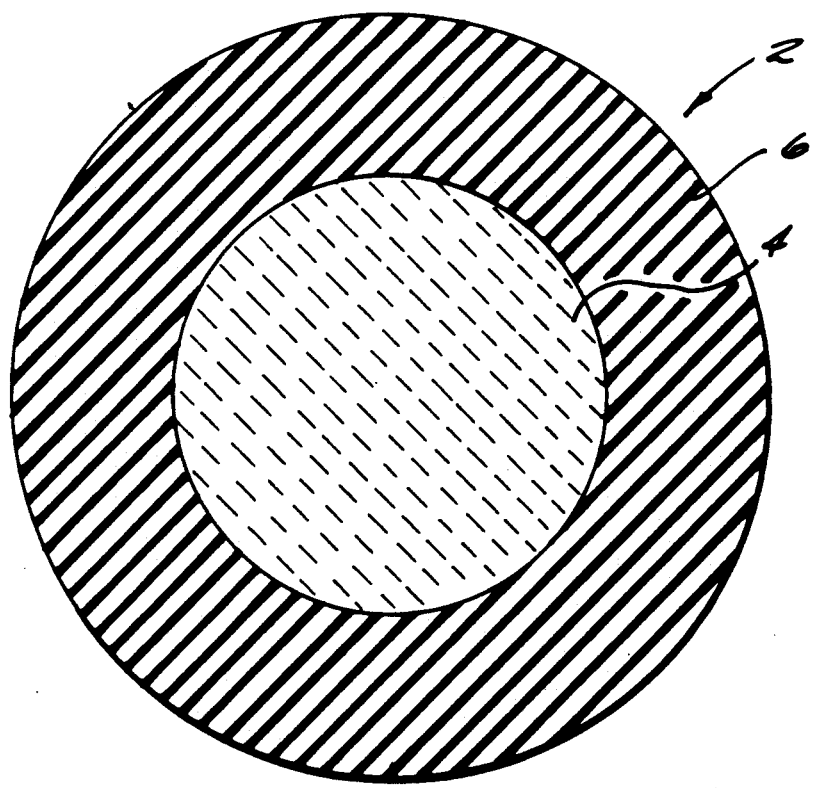

Referring to the FIGURE, the composite filler material 2 of the present invention includes an inorganic core 4 and a crosslinked silicone elastomer layer 6 covering the core 4 and chemically bonded to the core 4.

Particles of the composite filler material of the present invention are used as a filler in a polymer matrix to form a particulate filler polymer matrix composite material.

Matrix materials suitable for use in the present invention include thermoplastic polymers and thermoset polymers. Suitable thermoplastic polymers include fluoropolymers, polyolefins, polycarbonate, and polyphenylene sulfide. Suitable thermoset polymers include epoxies, polybutadienes, cyanate esters and phenolics.

Filler materials suitable for use as the inorganic core of the present invention include any inorganic filler material having surface hydroxyl groups. Suitable filler materials include particulate siliceous filler materials, glass fillers, metal fillers and metal oxide fillers. Preferred siliceous filler materials include silica, talc and clay. Amorphous fused silica particles are particularly preferred as the inorganic core of the present invention. Preferred glass filler materials include continuous glass fibers, discontinuous glass fibers, (e.g. chopped glass fibers, glass beads) and hollow glass microspheres. Preferred metal and metal oxide surfaces include aluminum, steel, copper and brass and oxides of aluminum, steel, copper and brass.

The composition of coating material of the present invention is chosen on an application by application basis based on the matrix material and filler material of interest and may be any crosslinked silicone polymer that may be chemically bonded to the filler material. The composition of the coating may be chosen to control the degree of interaction between the coating and the particular matrix material.

The silicone elastomer of the present invention is the crosslinked reaction product of a multifunctionally terminated polysiloxane and a silane cross linking agent.

A monofunctionally terminated polysiloxane is reacted with a multifunctional silane to form the multifunctionally terminated polysiloxane of the present invention. Suitable monofunctionally terminated polysiloxanes are those according to the structural formula:

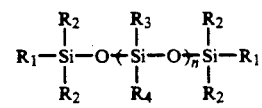

wherein:
- $R_1$ is a reactive functional group;
- $R_2$ are each independently alkyl or phenyl;
- $R_3$ and $R_4$ are each independently alkyl, phenyl or fluoroalkyl; and wherein the polysiloxane has a molecular weight between about 500 and about 80,000.

Suitable reactive functional groups include hydride groups, hydroxyl groups, alkoxyl, (e.g. methoxyl ethoxyl) groups, aminoalkyl, (e.g. aminopropyl, aminobutyl) groups, haloalkyl groups, (e.g. chloromethyl) groups, carbinol groups and carboxyalkyl, (e.g. methacryloxypropyl, carboxypropyl) groups.

R$_2$ may be an alkyl, (e.g. methyl, ethyl) group or a phenyl group.

R$_3$ and R$_4$ may be alkyl, (e.g. methyl, ethyl) groups, phenyl groups or fluoroalkyl, (e.g. 3,3,3,-trifluoropropyl) groups.

Monofunctionally terminated polydimethylsiloxanes, i.e. wherein R$_3$ and R$_4$ are each methyl groups, are preferred as the monofunctionally terminated polysiloxane of the present invention.

Suitable monofunctionally terminated polydimethylsiloxanes include silanol terminated polydimethylsiloxanes, alkoxyl (e.g. methoxyl, ethoxyl) terminated polydimethylsiloxanes, aminoalkyl, (e.g. aminopropyl, aminobutyl) terminated polydimethylsiloxanes, acetoxy terminated polydimethylsiloxanes, chloroalkyl (e.g. chloromethyl) terminated polydimethylsiloxanes, alkenyl, (e.g. allyl, vinyl) terminated polydimethylsiloxanes, carbinol, terminated polydimethylsiloxanes and carboxyalkyl, (e.g. methacryloxypropyl, carboxypropyl) terminated polydimethylsiloxanes.

Most preferably, the monofunctionally terminated polysiloxane comprises a silanol terminated polydimethylsiloxane or a hydride terminated polydimethylsiloxane.

Suitable multifunctional silane compounds are those having the structural formula:

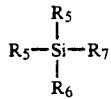

wherein:

R$_5$ is a hydrolyzable group;

R$_6$ is a reactive functional group; and

R$_7$ is an alkyl group, a hydrolyzable group, a reactive functional group or a nonreactive group.

Suitable hydrolyzable groups which include alkoxy (e.g. methoxy, ethoxy, butoxy) groups, halogen (e.g. chloro) groups and acyloxy groups.

Suitable reactive functional groups include hydride, alkoxyl, (e.g. methoxyl, ethoxyl, butoxyl) groups, aminoalkyl, (e.g. aminoethyl, aminopropyl, aminobutyl) groups, haloalkyl (e.g. chloromethyl, chloropropyl, bromomethyl) groups, glycidoxyalkyl, (e.g. glycidoxypropyl) groups, mercaptoalkyl, (e.g. mercaptomethyl, mercaptopropyl) groups, carboxyalkyl, (e.g. methacryloxypropyl) groups and alkenyl (e.g. allyl, vinyl) groups.

Suitable nonreactive groups include phenyl groups and alkyl groups. Examples of suitable multifunctional silane compounds include tetraethoxysilane, 3-aminopropyltriethoxysilane, chloromethyl-dimethylethoxysilane, 3-glycidoxypropyltrimethylsilane, 3-mercaptopropyltrimethoxysilane, 3-methacryloxypropyltrimethoxysilane, vinyl trimethoxysilane and phenyltrimethoxysilane.

The R$_5$ groups on the silane of the present invention provide functional groups that may be hydrolyzed to provide reactive sites for condensation reactions with hydroxyl groups on the surface of the inorganic core to bond the coating layer of the present invention to the surface of the inorganic core.

The multifunctional silane compound of the present invention is chosen so that at least one of the R$_5$, R$_6$, or R$_7$ substituent groups of the silane compound may be reacted with the R$_1$ group on the monofunctionally terminated polysiloxane to synthesize a multifunctionally terminated polysiloxane according to the formula:

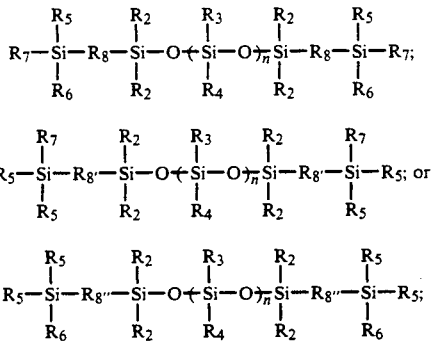

wherein

R$_2$, R$_3$, R$_4$, R$_5$, R$_6$ and R$_7$ defined as above and,

R$_8$, R$_{8'}$ and R$_{8''}$ denote the reaction product of an R$_1$ group and an R$_5$, R$_6$ or R$_7$ group, respectively.

The reaction between the R$_1$ group on the monofunctionally terminated polysiloxane and the substituent group on the silane compound is dependent upon the chemical composition of the respective functional groups and may be by any conventional reaction known in the art of the organosilicon chemistry conducted under appropriate conventional reaction conditions. Typically, the monofunctional polysiloxane is reacted with excess multifunctional silane to drive the reaction of all the R$_1$ groups on the monofunctional polysiloxane toward completion.

For example, in a preferred embodiment wherein the monofunctional polysiloxane comprises a silanol terminated polysiloxane, the R$_8$ may be made by hydrolyzing the hydrolyzable groups on the silane and condensing each of the silanol groups on the polysiloxane with a hydrolyzed group on the silane.

As a further example, in a preferred embodiment wherein the monofunctional polysiloxane comprises hydride terminated polysiloxane and the silane includes a vinyl functional group, the R$_8$ may be made by an addition reaction between the vinyl and hydride groups.

Silane crosslinking agents suitable for use in the present invention comprise any of the multifunctional silane compounds according to the structural formula:

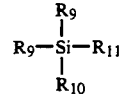

wherein:

R$_9$ is a hydrolyzable group;

R$_{10}$ is a reactive functional group or a hydrolyzable group; and

R$_{11}$ is an alkyl group, a hydrolyzable group, a reactive functional group or a non-reactive group.

Suitable alkyl groups, reactive functional groups, non-reactive groups and hydrolyzable groups are those described above with regard to the multifunctional silane compound.

The silane crosslinking agent may be the same compound as or may be a different compound from the multifunctional silane compound used to synthesize the multifunctional terminated polysiloxane. The quantity of crosslinker used is chosen based on the amount and molecular weight of the multifunctional polysiloxane used to provide an elastomer having a particular desired crosslink density.

The $R_6$, $R_7$, $R_{10}$ and $R_{11}$ substituent groups on the silanes of the present invention are chosen on the basis of the desired properties of the rubber layer, e.g. degree and type of crosslinking, desirability of nonreactive pendant groups, the desired degree of interaction between the coating layer and a particular matrix material. For example, The substituent groups on the silanes may be functional groups which may be reacted with a particular matrix material to form a chemical bond between the coating layer and the matrix. It is believed that forming chemical bonds between the coating layer and the matrix layer would provide increased strength to a composite material so produced. Alternatively, the substituent group on the silanes may be groups which provide very little interaction with a particular matrix material. It is believed that providing a coating layer that undergoes very little interaction, i.e. little adhesion, with the matrix material would provide improved toughness and ductility to a composite material so produced.

The multifunctionally terminated polysiloxane is crosslinked under suitable reaction conditions to form a reactive silicone network having unreacted silanol groups thereon. The inorganic core is coated with the reactive silicone network.

The reactive silicone network is cured to form a crosslinked silicone elastomer coating that is chemically bonded to the inorganic core. The reactive silicone network is chemically bonded to the core by condensation of hydroxyl groups on the surface of the core and the free silanol groups of the silicone network. The reactive network may be cured and reacted with the surface of the filler by heating the coated particles to a temperature of about 225° C. to about 275° C.

Alternately, the elastomer layer of the composite filler particle of the present invention, may be formed in situ by reacting a suitable multifunctional silane with a suitable inorganic filler to form a surface modified filler material having free silanol groups thereon, reacting a suitable multifunctionally terminated polysiloxane with the free silanol groups to form a coating layer and then crosslinking the coating layer to form a layer of crosslinked silicone elastomer that is bonded to the filler surface. Suitable fillers, multifunctional silanes, and multifunctional polysiloxanes are those discussed above.

The silicone elastomer may comprise up to about 0.5 volume fraction of the composite filler material of the present invention. Preferably, the filler material comprises from about 0.75 volume fraction to about 0.99 volume fraction inorganic core and from about 0.01 volume fraction and 0.25 volume fraction silicone elastomer. Most preferably, the filler material comprises from about 0.85 volume fraction to about 0.95 volume fraction inorganic core and from about 0.05 volume fraction to about 0.15 volume fraction silicone elastomer.

EXAMPLE 1

200 grams (7.7 mmoles) of a silanol terminated polydimethylsiloxane having a nominal MW of 26,000 (Petrarch System, PS 343) is reacted with 3.2 grams ((16.1 mmoles) of prehydrolyzed phenyltrimethoxylsilane by refluxing in hexane for 8 hours to form 201 grams of multi-silanol terminated polydimethylsiloxane, according to the reaction:

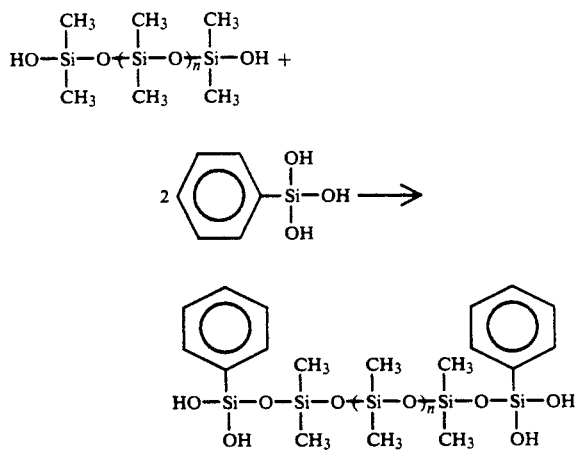

The multi-silanol terminated polydimethylsiloxane is cross linked by reacting with 3.0 grams (15.1 mmoles) of prehydrolyzed phenyltrimethoxysilane to form a rubbery reactive silicone according to the reaction:

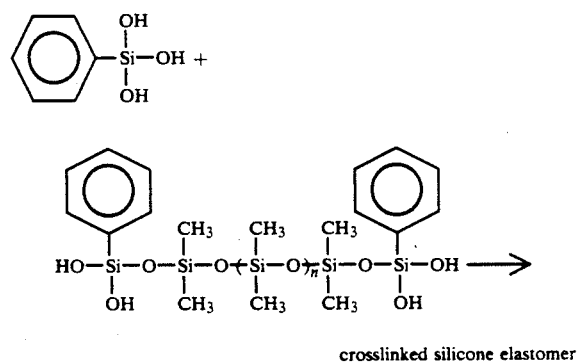

crosslinked silicone elastomer

Fillers were coated with different amounts of rubbery reactive silicone (0.01 to 0.20 volume fraction of coated filler). 2000 grams of amorphous fused silica (Harbison-Walker GP-7I) filler materials are coated with 100 grams of the rubbery reactive silicone by applying the rubbery reactive silicone with a carrier solvent onto the filler by a Patterson-Kelly twin shell blender, blending for 45 minutes and evaporating the carrier solvent.

The coated filler is heated to cure the rubbery reactive silicone at 250° C. for 4 hours and to bond the reactive silicone to the surface of filler by condensation of the silanols of the reactive silicone with the silanols on the filler surfaces

EXAMPLE 2

173 grams (6.2 mmoles) of hydride terminated polydimethylsiloxane having a nominal MW of 28,000 (Petrarch System, PS 543) is reacted with 2.0 grams (13.5 mmoles) of prehydrolyzed vinyltrimethoxysilane by refluxing the reactants in hexane for 8 hours in the presence of Pt catalyst to form 170 grams of multisilanol terminated polydimethylsiloxane, according to the reaction:

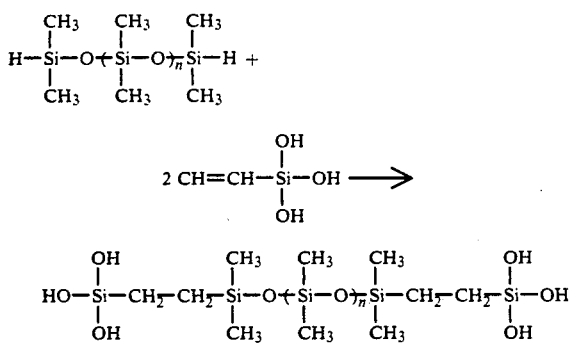

The multisilanol terminated polydimethylsiloxane is cross linked by reacting with 2 grams (13.5 mmoles) of prehydrolyzed vinyltrimethoxysilane to form a rubbery reactive silicone according to the reaction:

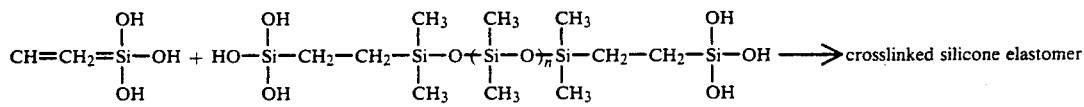

2000 grams of amorphous fused silica (Harbison-Walker G-7I) filler materials are coated with 100 grams of the rubbery reactive silicone by applying the rubbery reactive silicone with a carrier solvent onto the filler by a Patterson-Kelly twin shell blender, blending for 45 minutes, and evaporating the carrier solvent.

The coated filler is heated to cure the rubbery reactive silicone at 250° C. for 4 hours and to bond the reactive silicone to the surface of filler by condensation of the silanols of the reactive silicone with the silanols on the filler surface.

EXAMPLE 3

The coated particles of the present invention were used as a filler in a polyolefin matrix composite material. The performance of the materials so prepared was compared to that of materials made with untreated ceramic filler particles and to materials made with ceramic fillers treated with conventional silane coupling agents.

The filler particles used are listed in Table 1.

TABLE 1

| Filler | Core | Coating |
|---|---|---|
| A | silica | none |
| B | silica | 0.015 vol. fraction fluorinated silane |
| C | silica | 0.015 vol. fraction phenyltrimethoxysilane |
| D | silica | 0.020 vol. fraction silicone elastomer |
| E | silica | 0.071 vol. fraction silicone elastomer |
| F | silica | 0.103 vol. fraction silicone elastomer |
| G | silica | 0.166 vol. fraction silicone elastomer |

Amorphous fused silica (Harbison-Walker GP-7I) was used as the core of each filler. Fillers D, E, F and G were prepared according to the method of Example 2.

Composite materials were formulated according to the compositions given in Table 2.

The samples were prepared using "Holstalen GK9050", a medium molecular weight High Density Polyethylene manufactured by Hoechst. The composites were prepared using Brabender ® Plasticorder with the heating oil temperature set for 170° C. The initial temperature of the mixing head was 160° C. The mixing speed for all samples was 40 rpm. The weighed sample of polyethylene resin was placed in the mixing head with the blades rotating. After the resin melted completely in 2 minutes, the filler was added over a period of 90 to 120 seconds. The filler and resin were blended for an additional 6 to 7 minutes. The resulting composite material was removed from the blender and pressed in a hot (160°) platen hydraulic press between release sheets to an approximate thickness of 0.060". Tensile bar specimens were cut from the sheet and the elongation at failure of the materials was determined.

The composite samples were subjected to tensile testing using an ASTM D1708 "microtensile" die. Results of the testing are also given in Table 2.

TABLE 2

| COMPOSITE SAMPLE | MATRIX (vol %) | FILLER (vol %) | FILLER TYPE | ULTIMATE ELONGATION (%) |
|---|---|---|---|---|
| 1 | 100 | 0 | — | 657 |
| 2 | 60 | 40 | A | 3 |
| 3 | 50 | 50 | A | 1 |
| 4 | 60 | 40 | B | 3 |
| 5 | 50 | 50 | B | 2 |
| 6 | 60 | 40 | E | 212 |
| 7 | 50 | 50 | E | 19 |
| 8 | 60 | 40 | F | 131 |
| 9 | 50 | 50 | F | 73 |
| 10 | 60 | 40 | G | 203 |
| 11 | 50 | 50 | G | 111 |

EXAMPLE 4

The coated particles of the present invention were used as a filler material in a fluoropolymer matrix composite material. The performance of materials so prepared was compared to that of materials made with untreated ceramic filler and with ceramic fillers that had been treated with conventional silane coupling agents. The filler particles used are those listed in Table 1 of Example 3.

Composite materials were formulated according to the compositions given in Table 3. A copolymer of ethylene and chlorotrifluromethane (Halar ®5004, Ausimont) was used as the matrix material. The composite materials were prepared according to the method described in Example 3, except that the oil temperature was set to 260° C., the initial temperature of the mixing head was between 239° C. and 242° C. and the composite material was pressed at 550° F. In each of the samples coating a filler material, the volume fraction of the amorphous fused silica core was 0.5. The volume fraction of matrix material decreases correspondingly as the volume fraction of coating on the core is increased. Each of the compositions included 5 weight percent CaO (based on total composite weight).

Each of the samples was subjected to tensile testing. The results of the testing are also given in Table 3.

TABLE 3

| COMPOSITE SAMPLE | FILLER TYPE | ULTIMATE ELONGATION (%) |
|---|---|---|
| 12 | — | 234 |
| 13 | C | 0.7 |
| 14 | D | 1.6 |
| 15 | E | 17.2 |

TABLE 3-continued

| COMPOSITE SAMPLE | FILLER TYPE | ULTIMATE ELONGATION (%) |
|---|---|---|
| 16 | F | 33.8 |
| 17 | G | 31.6 |

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A composite filler material comprising:
   an inorganic core, and
   a layer of crosslinked silicone elastomer covering the core and chemically bonded to the core wherein the crosslinked silicone elastomer comprises the reaction product of a multifunctionally terminated polysiloxane and a first multifunctional silane.

2. The filler material of claim 1, wherein the core comprises a siliceous filler material, a glass filler material, a metal filler material or a metal oxide filler material.

3. The filler material of claim 2, wherein the core comprises amorphous fused silica.

4. The filler material of claim 1, wherein the multifunctionally terminated polysiloxane comprises the reaction product of a monofunctionally terminated polysiloxane and a second multifunctional silane.

5. The filler material of claim 4, wherein the first and second multifunctional silanes are identical.

6. The filler material of claim 1, wherein the material comprises from about 0.75 volume fraction to about 0.99 volume fraction inorganic core and from about 0.01 volume fraction to about 0.25 volume fraction crosslinked silicone elastomer.

7. A method for making a composite filler material, comprising:
   reacting a monofunctionally terminated polysiloxane with a multifunctional silane to form a multifunctionally terminated polysiloxane;
   reacting the multifunctionally terminated polysiloxane with a silane cross linking agent to form a reactive silicone network;
   coating an inorganic filler material with the reactive silicone network; and
   curing the reactive silicone network to form a crosslinked silicone elastomer coating that is chemically bonded to the filler material.

8. A composite filler material made by the method of claim 7.

9. The method of claim 7, wherein the monofunctionally terminated polysiloxane comprises:

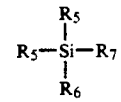

wherein:
   $R_1$ is a reactive functional group;
   $R_2$ is a alkyl or phenyl;
   $R_3$ and $R_4$ are each independently alkyl, phenyl or fluoroalkyl; and
   wherein the polysiloxane has a molecular weight between about 500 and about 80,000

10. The method of claim 9, wherein $R_1$ is selected from the group consisting of hydride, hydroxyl, alkoxyl, aminoalkyl, haloalkyl, carbinol and carboxyalkyl.

11. The method of claim 9, wherein $R_2$, $R_3$ and $R_4$ are each methyl.

12. The method of claim 7, wherein the silane comprises:

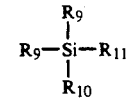

wherein:
   $R_5$ is a hydrolyzable group;
   $R_6$ is a reactive functional group; and
   $R_7$ may be an alkyl group, a hydrolyzable functional group, a reactive functional group or a nonreactive group.

13. The method of claim 12, wherein $R_5$ is alkoxyl or halo or acyloxyl.

14. The method of claim 12, wherein $R_6$ is selected from the group consisting of hydride, alkoxyl, aminoalkyl, haloalkyl, glycidoxyalkyl, mercaptoalkyl, carboxyalkyl and alkenyl.

15. The method of claim 12, wherein $R_7$ is selected from the group consisting of alkyl, alkoxyl, haloalkyl, hydride, aminoalkyl, glycidoxyalkyl, mercaptoalkyl, carboxyalkyl, alkenyl and phenyl.

16. The method of claim 7, wherein the silane crosslinking agent comprises:

$$R_9-\underset{\underset{R_{10}}{|}}{\overset{\overset{R_9}{|}}{Si}}-R_{11}$$

wherein:
   $R_9$ is a hydrolyzable functional group;
   $R_{10}$ is a reactive functional group; and
   $R_{11}$ may be an alkyl group, a hydrolyzable functional group, a reactive functional group or a nonreactive group.

17. The method of claim 16, wherein $R_9$ is alkoxyl, halo or acyloxyl.

18. The method of claim 16, wherein $R_{10}$ is selected from the group consisting of hydride, alkoxyl, aminoalkyl, haloalkyl, glycidoxypropyl, mercaptoalkyl, carboxyalkyl and alkenyl.

19. The method of claim 16, wherein $R_{11}$ is selected from the group consisting of hydride, alkyl, alkoxyl, haloalkyl, aminoalkyl, glycidoxyalkyl, mercaptoalkyl, carboxyalkyl, alkenyl and phenyl.

20. A method for making a composite filler material, comprising:
   reacting a first multifunctional silane with an inorganic filler particle to form a surface modified inorganic filler particle having free silanol groups thereon;
   reacting a second multifunctional silane with a monofunctionally terminated polysiloxane to form a multifunctionally terminated polysiloxane;
   coating the surface modified particle with the multifunctionally terminated polysiloxane;
   reacting to multifunctionally terminated polysiloxane with the free silanol groups on the surface modified particle to form a coating layer on the particle that is chemically bonded to the particle; and
crosslinking the coating layer.

21. A composite filler material made by the process of claim 20.

22. The method of claim 20 wherein an excess of the first multifunctional silane is provided and wherein the coating layer is reacted with the excess to crosslink the coating layer.

23. The method of claim 20, wherein the first multifunctional silane, comprises:

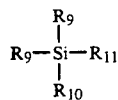

wherein:
$R^9$ is a hydrolyzable group;
$R^{10}$ is a reactive functional group or a hydrolyzable group; and
$R^{11}$ may be an alkyl group, a hydrolyzable group, a reactive functional group or a nonreactive group.

24. The method of claim 23, wherein $R^9$ is alkoxyl, halo or acyloxyl.

25. The method of claim 23, wherein $R^{10}$ is selected from the group consisting of hydride, alkoxyl, aminoalkyl, haloalkyl, glycidoxypropyl, mercaptoalkyl, carboxyalkyl and alkenyl.

26. The method of claim 23, wherein $R^{11}$ is selected from the group consisting of hydride, alkyl, alkoxyl, haloalkyl, aminoalkyl, glycidoxyalkyl, mercaptoalkyl, carboxyalkyl, alkenyl and phenyl.

27. The method of claim 20, wherein the monofunctionally terminated polysiloxane comprises;

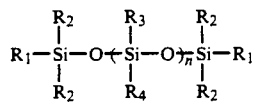

wherein:
$R_1$ is a reactive functional group;
$R_2$ is alkyl or phenyl;
$R_3$ and $R_4$ are each independently alkyl, cycloalkyl or fluoroalkyl; and
wherein, the polysiloxane has a molecular weight between about 500 and about 80,000.

28. The method of claim 27, wherein $R_1$ is selected from the group consisting of hydride, hydroxyl, alkoxyl, aminoalkyl, haloalkyl, carbinol and carboxyalkyl.

29. The method of claim 20, wherein the second multifunctionally terminated silane comprises:

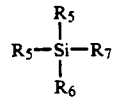

wherein:
$R_5$ is a hydrolyzable functional group;
$R_6$ is a reactive functional group; and
$R_7$ may be an alkyl group, a hydrolyzable functional group, a reactive functional group or a nonreactive functional group.

30. The method of claim 29, wherein $R_5$ is alkoxyl, halo or acyloxyl.

31. The method of claim 29, wherein $R_6$ is selected from the group consisting of hydride, alkoxyl, aminoalkyl, haloalkyl, glycidoxyalkyl, mercaptoalkyl, carboxyalkyl and alkenyl.

32. The method of claim 29, wherein $R_7$ is selected from the group consisting of alkyl, alkoxyl, haloalkyl, hydride, aminoalkyl, glycidoxyalkyl, mercaptoalkyl, carboxyalkyl, alkenyl and phenyl.

33. The method of claim 20, wherein the first and second multifunction silanes are identical.

34. The composite filler material of claim 1, wherein the inorganic core comprises a material having surface hydroxyl groups.

35. The composite filler material of claim 34, wherein the elastomer layer is formed by crosslinking a reactive silicone network and the chemical bonding between the elastomer layer and the inorganic core is formed by condensation of silanol groups of the reactive silicone network with surface hydroxyl groups of the core.

36. The composite filler of claim 35, wherein the elastomer layer is crosslinked by condensation of silanol groups of the reactive network.

37. The method of claim 7, wherein the reactive silicone network includes a plurality of unreacted silanol groups, the inorganic filler material includes a plurality of hydroxyl groups on the surface thereof and the chemical bonding between the elastomer coating and the filler material is formed by condensation of silanol groups of the network with hydroxyl groups of the filler material.

38. The method of claim 37, wherein the elastomer coating is crosslinked by condensation of silanol groups of the reactive silicone network.

39. The method of claim 20, wherein the multifunctionally terminated polysiloxane includes a plurality of terminal silanol functional groups and wherein the coating layer is chemically bonded to the filler particle by condensation of silanol groups of the multifunctionally terminated polysiloxane with the silanol groups on the particle.

40. The method of claim 20, wherein the coating layer is crosslinked by condensation of silanol groups of the multifunctionally terminated polysiloxane.

41. A composite filler material comprising:
an inorganic core;
a layer of crosslinked silicone elastomer covering the core and chemically bonded to the core; and
wherein said composite filler material comprises from about 0.75 volume fraction to about 0.99 volume fraction inorganic core and from about 0.01 volume fraction to about 0.25 volume fraction crosslinked silicone elastomer.

42. The filler material of claim 41 wherein:
said core comprises a siliceous filler mateial, a glass filler material, a metal filler mateial or a metal oxide filler material.

43. The filler material of claim 42, wherein the core comprises amorphous fused silica.

44. The filler material of claim 41, wherein the crosslinked silicone elastomer comprises the reaction product of a multifunctionally terminated polysiloxane and a first multifunctional silane and wherein the multifunctionally terminated polysiloxane comprises the reaction product of a monofunctionally terminated polysiloxane and a second multifunctional silane.

45. The filler material of claim 44 wherein the first and second multifunctional silanes are identical.

46. The composite filler material of claim 41 wherein the inorganic core comprises a material having surface hydroxyl groups.

47. The composite filler material of claim 46 wherein the elastomer layer is formed by crosslinking a reactive silicone network and the chemical bonding between the elastomer layer and the inorganic core is formed by condensation of silanol groups of the reactive silicone network with surface hydroxyl groups of the core.

48. The composite filler of claim 47 wherein the elastomer layer is crosslinked by condensation of silanol groups of the reactive network.

* * * * *